United States Patent
Scherer

[15] 3,661,737
[45] May 9, 1972

[54] RECOVERY OF VALUABLE COMPONENTS FROM MAGNESIUM CELL SLUDGE

[72] Inventor: John G. Scherer, Tulsa, Okla.

[73] Assignee: Kaiser Aluminum & Chemical Corporation, Oakland, Calif.

[22] Filed: Oct. 29, 1969

[21] Appl. No.: 872,364

[52] U.S. Cl. .........................................204/70, 75/67, 75/94
[51] Int. Cl. ....................C22d 3/08, C22b 45/00, C22b 9/10
[58] Field of Search ..................................204/70; 75/67, 94

*Primary Examiner*—John H. Mack
*Assistant Examiner*—R. L. Andrews
*Attorney*—James E. Toomey, Paul E. Calrow, Harold L. Jenkins and John A. Sarjeant

[57] ABSTRACT

Method for recovering valuable components from a molten admixture of fused magnesium salt, disperse magnesium metal and other substances, e.g. magnesium electrolytic cell sludge, including holding such admixture in fused state, under a fluoride-containing protective flux for magnesium metal, to form a layer of magnesium dispersed in a sludge and a separate layer of purified magnesium salt, withdrawing the metal-containing layer to a refining zone and thoroughly admixing therewith a metal-collecting magnesium fluoride-containing flux to form a layer of separated magnesium metal and a layer of residual sludge containing magnesium metal, recovering the separated metal, the residual sludge can then be admixed with an amount of fluoride-containing flux to form a eutectic having a lower melting point than that of magnesium metal, maintaining such eutectic in molten form below the melting point of magnesium metal, and mechanically recovering magnesium metal therefrom, the protective and metal-collecting fluxes being substantially free of alkaline earth metals other than magnesium.

8 Claims, No Drawings

RECOVERY OF VALUABLE COMPONENTS FROM MAGNESIUM CELL SLUDGE

BACKGROUND OF THE INVENTION

It is difficult to recover magnesium metal which is dispersed in small particles through a magnesium salt mass and it is also difficult to recover valuable salt from such mass, largely because of the slight or small differences in specific gravities which exist therein. For instance, in the operation of an electrolytic cell for the production of magnesium metal by electrolysis of fused magnesium salt, such as magnesium chloride, it is well known that sludges or bottom layers are formed which must be removed from time to time as the cell is operated. These bottom layers contain cell electrolyte or fused salt, magnesium metal, magnesium oxide and other substances or impurities which may have come in with the cell feed or may be developed in the cell operation, e.g. particles of carbon from the carbon anodes and salt components added for specific purposes.

When a cell bath or electrolyte is used in this process which is of lower specific gravity than, i.e. is lighter than, magnesium metal produced, it has been found that the cell sludge usually contains quite high amounts of occluded magnesium metal and also high amounts of cell electrolyte. The amount of such metal can run as high as 20 percent and the electrolyte, as high as 45 percent, by weight, of the total sludge dredged off or otherwise removed from the cell. It is quite uneconomical to discard such sludge to waste because of the loss of such constituents.

However, methods heretofore proposed for recovery of valuable components of such sludge, including especially the magnesium metal and the electrolyte, have had certain disadvantages. One such process involves leaching of the mass with water or a dilute aqueous solution of magnesium salt to dissolve the salt components away from the metal but in this process the metal is dispersed in the sludge in very fine particles in many instances, exposing large surfaces to the action of the water with consequent formation of $Mg(OH)_2$ and loss thereby of metal values. Another proposed process is a dry recovery by crushing and screening of the dried solid sludge, but in the production of magnesium using a lighter-than-molten magnesium electrolyte the sludge is very hygroscopic and does not undergo the dry recovery method efficiently.

It is desired, therefore, to recover valuable components from such mixtures with good efficiency and without loss, alteration or destruction of such components. It is also desired to employ in a recovery process compatible substances which can be, if desired, recycled to the operating electrolytic cell without introduction thereinto of foreign or undesirable substances. These and other objects and advantages are attained by the process and fluxes of the present invention as will be evident from the description below.

BRIEF SUMMARY OF THE INVENTION

This invention relates to a method for recovering valuable components from an admixture of magnesium salt, disperse magnesium metal and other substances, for example, from a sludge developed in the operation of an electrolytic cell wherein magnesium metal is being produced by electrolysis of fused magnesium salt. The method relates particularly to a cell where fused magnesium bath contains magnesium chloride; and, more particularly, where the bath is of lower specific gravity than the magnesium metal produced. Such sludge contains typically magnesium electrolyte, particularly magnesium chloride, magnesium metal dispersed therethrough in discrete particles or droplets and other substances such as magnesium oxide, carbon particles from the electrodes, other bath constituents such as lithium chloride and other impurities or bath additives. The differences in specific gravities of the components are quite small and separation is ordinarily quite difficult.

In carrying out the present method, the salt melt or sludge is held in a settling zone or vessel, which is heated in any desired manner to maintain the material in fused state. The temperature is not critical but is high enough to maintain the fused condition. A protective flux is provided over the upper surface of the melt which prevents burning of any metal exposed at such surface and which breaks the surface tension of the crust or skin over the sludge and permits separation of the components.

The mass when so held forms a layer of electrolyte and a layer of sludge containing magnesium metal dispersed therein. The layer of electrolyte is withdrawn and is suitably recycled to the electrolytic cell. In contrast present fluxes contain $CaF_2$ and $BaCl_2$ which are undesirable in the cell bath. If desired, the constituents thereof can be adjusted to provide the proper cell composition, e.g. by addition of depleted amounts of magnesium chloride, or of other component.

The metal-containing sludge layer is withdrawn to a refining zone where it is mixed with a metal-collecting, inspissating flux high in fluoride and substantially free of alkaline earth metal ions other than magnesium. This flux is thoroughly mixed with the molten metal by agitating, for example, by means of an agitator operating at 100 to 200 r.p.m., or in any other desired manner; and acts to collect or to coalesce the metal into a mass which separates from the residual sludge and is separately withdrawn to a holding or to a casting zone.

The residual sludge still contains a small amount of dispersed magnesium metal and this sludge is then mixed with an amount of a high chloride flux, especially such a flux containing from about 40 to about 65% KCl, about 25 to about 50% $MgCl_2$ and from about 2 to about 8% $CaF_2$ to form with the non-metal components a eutectic mixture which has a melting point less than that of the magnesium metal. A typical high chloride flux could have 55% KCl, 40% $MgCl_2$ and 5% $CaF_2$. This mass or mixture is then maintained in fused state at a temperature below the melting point of magnesium, i.e. below about 650° C, so that the mass comprises the fused or molten eutectic and solid particles of magnesium metal dispersed therethrough. The solid magnesium particles are mechanically recovered therefrom, suitably by screening or filtering.

The protective flux is substantially free of alkaline earth metal ions other than magnesium, especially being free of Ca and Ba ions, and it contains from 60 to 70% $MgCl_2$, from 38 to 25% alkali metal chloride, advantageously potassium chloride, and from 1 to 10%, advantageously about 2% $MgF_2$, by weight based on total weight of the flux. A very useful flux of this type has been found to contain 65% $MgCl_2$, 33% KCl and 2% $MgF_2$.

The metal-collecting, inspissating flux is also substantially free of the alkaline earth ions as indicated above, and suitably contains from 50 to 70% of a chloride of magnesium or lithium, from 5 to 15% $MgF_2$, the remainder magnesium oxide. It is important that this flux contain at least 5 percent of a fluoride of lithium or magnesium. For instance, one such flux contains from 50 to 60 percent magnesium chloride, from 25 to 35 percent magnesium oxide and 15% $MgF_2$; and another useful flux contains 70 percent lithium chloride and 30 percent lithium fluoride. These halides are suitable for incorporation in the lighter-than-magnesium electrolyte and do not adversely affect the density relationships of the components of the operating cell. The percentages are by weight based on total weight of the flux.

It is an advantage of the present invention, both as to the process and as to the novel fluxes described herein, that the recovered electrolyte can be returned to the operating cell and that substantially all of the magnesium trapped in the cell sludge is recovered in useful form. The process can be operated in a batch or in a continuous manner. It has been found that the metal-collecting flux containing 15 to 30 percent of the magnesium or lithium fluoride as described above effects very rapid coalescence of the magnesium metal in the present process.

DETAILED DESCRIPTION OF THE INVENTION

The invention and some modes of carrying out the same will be illustrated by the following detailed description and specific example.

EXAMPLE

Into a suitably heated furnace there is charged an amount of sludge developed in an electrolytic cell wherein magnesium metal is being produced by electrolysis of a fused electrolyte containing about 4% $MgCl_2$, 3.3% $MgF_2$, 11.7% NaCl, 5% KCl and 76% LiCl. The sludge contains approximately 30% Mg metal, 40% of the above-described electrolyte and 30 percent insoluble impurities, substantially all MgO. The furnace also contains a protective flux consisting essentially of about 64% $MgCl_2$, 34% KCl and 2% $MgF_2$ and the mass is maintained therein in molten condition and held at a temperature of from 660° to 790° C until two layers have separately formed, of which the top layer is essentially the lighter-than-magnesium electrolyte, and the lower layer is molten Mg metal in admixture with a residual sludge. The electrolyte layer is dipped off and returned to the electrolytic cell.

The metal-sludge layer is withdrawn to a refining zone where it is mixed thoroughly with a metal-collecting flux containing about 60% $MgCl_2$, 25% MgO and 15% $MgF_2$, whereby the metal coalesces into a separate layer and is drawn off from the residual sludge.

The latter still contains about 7% Mg metal and to it is added sufficient high chloride flux to form with the non-metallic components a eutectic mixture having a melting point less than that of Mg metal, i.e. less than about 650° C and suitably of about 550° C. The residual sludge is held at about 600° C and is passed through a metal screen to recover the Mg metal which is dispersed through such sludge eutectic in the form of small solid particles. About 75 percent of such dispersed magnesium metal is thereby recovered in this step.

Instead of the metal-collecting flux described in the above example, it has been found that such a flux comprising about 70% LiCl and 30% LiF is also satisfactory for use herein. Another metal-collecting flux found useful in this process consists essentially of 50% $MgCl_2$, 35% MgO and 15% $MgF_2$. The Mgo increases density of the flux and aids in thorough distribution through the sludge being treated.

In the present specification and claims, parts and percentages are by weight unless otherwise indicated. It will be understood that the various layers mentioned herein are not completely devoid of the substances of other layers associated therewith but are predominantly metal layers, or other layers as indicated.

Having now described the invention,

What is claimed is:

1. A method for recovering valuable components from sludge developed in a reaction zone for production of magnesium metal by electrolysis of magnesium chloride-containing electrolyte, which comprises:
   a. withdrawing sludge from said zone to a settling zone;
   b. heating said settling zone to a temperature high enough to maintain sludge in a molten state;
   c. adding to said sludge a protective flux consisting essentially of from 60 to 70% $MgCl_2$, from 38 to 25 percent alkali metal chloride, and from 1 to 10% $MgF_2$;
   d. holding said sludge and flux in said heated settling zone until there is formed a layer of said electrolyte and a layer of magnesium metal and sludge;
   e. separately recovering said electrolyte;
   f. withdrawing said metal and sludge to a metal-refining zone containing a metal-collecting flux consisting essentially of from 50 to 70 percent chloride of lithium or magnesium, from 15 to 30 percent of a fluoride of magnesium or lithium, remainder MgO;
   g. admixing said molten metal, sludge and flux in said zone;
   h. allowing resultant admixture to settle to form a layer of molten magnesium metal and a layer of residual sludge;
   i. separately recovering said molten magnesium metal.

2. The method of claim 1 wherein the residual sludge is admixed with sufficient halide mixtures to form with the non-magnesium components thereof a eutectic mixture having a melting point less than that of magnesium metal, maintaining said residual sludge in molten state at a temperature below the melting point of said dispersed magnesium metal, and mechanically recovering said dispersed magnesium metal, said halide mixture consisting essentially of from about 40 to about 65% $KCl_2$, about 25 to about 50% $MgCl_2$, and from about 2 to about 8% $CaF_2$.

3. Method as in claim 1, wherein said alkali metal chloride of said protective flux is KCl.

4. Method as in claim 1, wherein said protective flux consists essentially of about 65% $MgCl_2$, about 33% KCl and about 2% $MgF_2$.

5. Method as in claim 1, wherein said metal-collecting flux consists essentially of from 50 to 60% $MgCl_2$, from 25 to 35% MgO, and 15% $MgF_2$.

6. Method as in claim 1, wherein said metal-collecting flux consists essentially of about 70% LiCl and about 30% $LiF_2$.

7. Method as in claim 1, wherein said sludge comprises about 30 percent magnesium metal, about 40 percent electrolyte and about 30 percent insoluble impurities.

8. Method as in claim 1, wherein said electrolyte has a lower specific gravity than magnesium.

* * * * *